Figure 1:
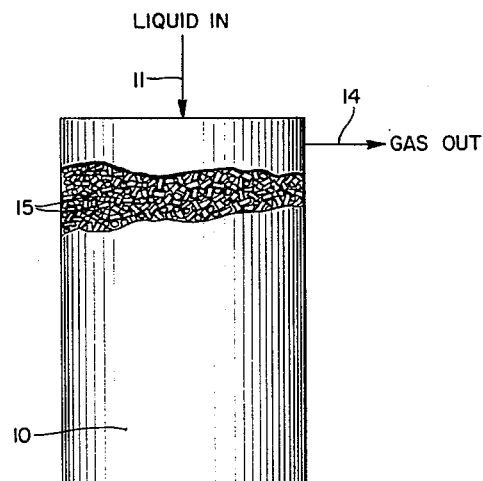
Figure 2:
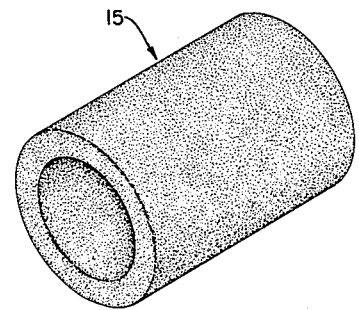

Feb. 23, 1965    B. J. LERNER ETAL    3,170,969
GAS-LIQUID CONTACTING OPERATIONS
Filed Aug. 1, 1960

INVENTORS
BERNARD J. LERNER
MAX LEVA
BY
ATTORNEY

United States Patent Office 3,170,969
Patented Feb. 23, 1965

3,170,969
GAS-LIQUID CONTACTING OPERATIONS
Bernard J. Lerner, 727 Orchard Hill Drive, and Max Leva, 1030 Dallett Road, both of Pittsburgh, Pa.
Filed Aug. 1, 1960, Ser. No. 46,336
2 Claims. (Cl. 261—94)

This invention relates to improvements in gas-liquid contacting operations.

In gas-liquid contacting operations, one of the most commonly used contacting devices is a so-called packed tower wherein the liquid feed flows downwardly over packing material such as rings, cylinders, saddles or the like, usually in countercurrent fashion to the gas which flows upwardly through the packing. The purpose of the packing material is to provide a relatively large surface area over which the liquid may flow as a relatively thin film, while at the same time, providing channels or passages for gas flow, thus permitting the gas to flow over and in intimate contact with the liquid film on the surfaces of the packing.

In the operation of packed towers, it is desirable of course, to maintain the highest possible mass transfer efficiency consistent with other desirable operating characteristics such as reasonable pressure drop, a reasonable latitude of gas and liquid throughput and the like, etc. The mass transfer rate ($K_Ga$) (defined as the rate of transfer of a given component between the liquid-gas phase per unit time per unit driving force per unit volume of tower packing) is a measure of the overall capacity of the packed tower, and accordingly, there is a direct proportion between the mass transfer efficiency and the volume of packing required to perform a given duty. Much of the effort in the past directed toward improving the mass transfer efficiency of packed towers has been concerned with the redesign of the shape and/or arrangement of the packing material; use of baffling, distributors and approaches of a similar nature. In an approach of this type, it has been found that redesign of the tower packing and/or associated tower structure will often result in changes in other important characteristics such as pressure drop, range of operable gas throughputs and the like. Increases in mass transfer rate accompanied by changes in the shape, size or arrangement of packing are often accompanied by undesirable changes in these other variables such that the optimum design is a compromise between maximum transfer rates and these other variables.

In accordance with the present invention a means has now been found for improving the mass transfer efficiency of a packed gas-liquid contact tower with little or no alteration of the other operating characteristics of the tower such as pressure drop and the like. It has been found that this may be accomplished by providing the surfaces of the packing material with a very thin coating of colloidal particles of a water insoluble inorganic oxide, preferably silica, deposited thereon by contacting the packing with a sol (i.e. a colloidal dispersion) of the inorganic oxide. By some alteration in physical nature of the packing surfaces, such a treatment has been found to result in a marked increase in the mass transfer efficiency without significantly altering the other operating characteristics of the column. Another advantage, of importance in connection with the so-called dumped packings is an increase in the coefficient of friction between packing pieces which minimizes slipping and shifting of the packing pieces during tower operation.

Generally speaking, sols or colloidal dispersions of water insoluble inorganic oxides may be employed in the practice of the invention. A sol or colloidal dispersion may be generally defined as a dispersion of solid particles in a liquid having a particle size ranging from about 1–200 millimicrons ($10^{-6}$ millimeters), the particle size being more usually in the range of from 10–100 millimicrons. Various liquid vehicles may be employed such as water, alcohols, or other organic liquids, water generally being preferred.

From the standpoint of cost, availability, effectiveness and the fact that they provide chemically inert coatings, silica sols are preferred in the practice of the invention. Preferred are aqua sols, that is sols in which the liquid medium is water or a mixture of water and a compatible organic liquid such as an alcohol.

Many methods for preparing silica sols are known. One of the earliest processes of commercial importance is described in U.S. Patent 2,244,325, to Bird, according to which a dilute sodium silicate solution is passed through a bed of an acidic ion exchange resin, such as an acid treated carbonaceous zeolite, to reduce the alkali metal ion content of the original silicate solution to low values such that the final $SiO_2$:$Na_2O$ ratio is at least 10:1 and preferably higher such as 50:1 or 100:1. This yields a dilute aqueous silica sol which may then be concentrated by evaporation.

Another suitable method for the preparation of silica sols is described in U.S. Patent 2,375,738, to White, according to which a sodium silicate solution is neutralized with acid to precipitate the silica gel, after which the gel is synerized, crushed, washed to remove soluble salts, covered with a dilute alkali (e.g. 0.1% NaOH) solution and then treated in an autoclave at temperatures between 80° C. and 200° C. for several hours.

Other more recent patents describing various methods of preparing silica sols are e.g. U.S. Patents 2,574,902; 2,577,485; 2,680,721; 2,601,235; 2,668,149; 2,650,200; and 2,856,302.

In such silica aqua-sols, the size of the silica particles generally ranges from 10–100 millimicrons. Such sols contain small amounts of alkali. Expressed in terms of $SiO_2$:$Na_2O$ ratios, the silica:alkali content generally ranges from 50:1 to 500:1. Such small amounts of alkali are desirable for the purpose of imparting good stability to the sol. The alkaline reacting sols are thus preferred because of their stability. Instead of sodium ions, other forms of alkali such as potassium, lithium or ammonium ions may be employed for the purpose of stabilizing the sol.

While the concentration of inorganic oxide in the sol used for the treatment is not critical, generally sols containing from 20% to 60% by weight of the inorganic oxide are preferred. Commercial silica sols, for example, are generally available in concentrations of e.g. 10% to 50% silica as $SiO_2$.

Other suitable sols of inorganic oxides include, for example, sols of alumina, mixtures of silica and alumina, tungstic acid, molybdenum trioxide, antimonic acid, vanadium oxide, columbic acid, germainium oxide, titania, zirconia, thoria and the like. Particularly suitable of the group mentioned above are alumina sols or sols of alumina-silica since the coatings produced are chemically quite inert and generally have no tendency to produce catalytic or other effects on the materials being treated.

The invention is applicable in general to packed towers including packing materials of varying shapes, sizes, materials of construction, design and arrangement. Thus, the invention is applicable to the treatment of so-called "dumped" tower packings consisting of discrete shaped pieces such as rings, cylinders, saddles and the like which are dumped at random into the tower. It is also applicable to so-called stacked tower packings which are arranged in a predetermined fashion in order to obtain some coordination of flow in the tower. The invention may also be applied to other packings such as grids and packings of glass or plastic fibers. Any of the standard materials of construction may be employed for the pack-

We claim:
1. In a gas-liquid contact tower having means to supply gas and liquid to packing material contained within said tower, said packing material providing a relatively large surface area within said tower over which streams of said gas and liquid flow, the improvement which comprises the utilization of a packing material having impervious, non-absorbent external surfaces, said surfaces being provided with a thin, continuous coating, covering essentially the entire surfaces of said packing, said coating consisting of sub-microscopic particles of silica ranging of the order of 1 to 200 millimicrons in size, whereby substantially increased liquid filming over the impervious, non-absorbent external surfaces of said packing occurs, thereby substantially increasing the mass transfer efficiency of said tower without significant alteration of the gas pressure drop therethrough.

2. In a gas-liquid contact tower as set forth in claim 1, the improvement wherein the thin, continuous coating on the external surfaces of said packing material consists of submicroscopic particles of silica-alumina ranging of the order of 1 to 200 millimicrons in size.

References Cited by the Examiner

UNITED STATES PATENTS

| | | | |
|---|---|---|---|
| 2,085,129 | 6/37 | Stoewener. | |
| 2,470,652 | 5/49 | Scofield | 261—94 |
| 2,754,224 | 7/56 | Caroselli | 117—169 X |
| 2,783,982 | 3/57 | Kahl | 261—112 X |
| 2,809,818 | 10/57 | Munters | 261—112 X |
| 2,819,681 | 1/58 | Luvisi | 117—169 X |
| 2,893,891 | 7/59 | Bradstreet et al. | 117—100 X |
| 2,919,211 | 12/59 | Labino | 55—524 X |
| 3,057,744 | 10/62 | Barbaras | 117—169 X |

NORMAN YUDKOFF, *Primary Examiner.*

HERBERT L. MARTIN, GEORGE D. MITCHELL,
*Examiners.*